United States Patent [19]

Carrow et al.

[11] 3,976,821

[45] Aug. 24, 1976

[54] ROTATIONALLY MOLDING A MULTILAYERED ARTICLE

[75] Inventors: Guy E. Carrow; Robert L. Rees, both of Bartlesville, Okla.

[73] Assignee: Phillips Petroleum Company, Bartlesville, Okla.

[22] Filed: May 14, 1973

[21] Appl. No.: 359,724

[52] U.S. Cl. ............................ 428/474; 260/2.5 B; 260/2.5 M; 260/2.5 HA; 264/45.7; 264/54; 264/113; 264/114; 264/126; 264/255; 264/311; 264/DIG. 5; 264/DIG. 18; 428/500; 428/515
[51] Int. Cl.² .................. B29C 5/04; B29D 9/00; B29F 5/00; B29G 7/00
[58] Field of Search .............. 260/69.9 GA, 2.5 B, 260/2.5 M, 2.5 HA; 264/113, 114, 310, 311, 255, 45.7, 126, 54, DIG. 5, DIG. 18; 428/474, 500, 515, 516, 517

[56] References Cited
UNITED STATES PATENTS

| | | | |
|---|---|---|---|
| 2,659,107 | 11/1953 | De Bell | 264/310 |
| 2,994,919 | 8/1961 | Schafer et al. | 264/311 |
| 2,999,780 | 9/1961 | Perrault | 264/311 |
| 3,214,422 | 10/1965 | Mageli et al. | 260/93.7 |
| 3,297,738 | 1/1967 | Mageli et al. | 260/94.9 GA |
| 3,449,191 | 6/1969 | Taylor | 260/94.9 GA |
| 3,584,105 | 6/1971 | Pekor | 264/311 |
| 3,652,368 | 3/1972 | Formo | 264/311 |
| 3,818,086 | 6/1974 | Stastny et al. | 265/45 |

OTHER PUBLICATIONS

Sittig, Polyolefin Resin, Gulf Pub. Co., Housten (1961), pp. 3–6.
Floyd, Polyamide Resins, Reinhold, N.Y. (1962), pp. 3 & 111.

*Primary Examiner*—Willard E. Hoag

[57] ABSTRACT

A hollow multilayered article is rotationally molded by introducing into the mold particles of a hompolymer or copolymer of ethylene containing a crosslinking agent and heating the mold during rotation thereof to melt this first polymeric layer. Solid particles of a different polymer are then introduced into the mold at a time after at least substantially all of the particles of the first polymer have melted and prior to the time when the inner surface of the first layer would become smooth and glossy. The mold is then rotated and heated to melt the second polymer. The mold is then cooled and the multilayered article removed.

15 Claims, No Drawings

ROTATIONALLY MOLDING A MULTILAYERED ARTICLE

This invention relates to rotational molding. In a specific aspect, the invention relates to a method for rotationally molding a hollow multilayered article.

Rotational molding is accomplished by supplying to a mold a measured amount of powdered thermoplastic moldable material and rotating the mold while heating it to fuse the thermoplastic powder and then cooling the mold to cause the molded article to solidify. Usually, the mold is closed and is rotated about more than one axis, for example, two axes at right angles, to distribute the powdered material throughout the mold to produce a completely molded article. It is highly desirable to produce by rotational molding, articles which are suitable for severe service requirements. For example, it is desirable to produce articles having high impact strength and resistance to stress cracking. It has been found that a homopolymer of ethylene or a copolymer of ethylene and at least one mono-1-olefin hydrocarbon having 3 to 8 carbon atoms per molecule can be admixed with a crosslinking agent, particularly an acetylenic diperoxy compound, to produce a molding composition which can be formed into molded articles having high impact strength and high resistance to stress cracking. However, in many applications, for example, gasoline tanks, it is highly desirable that the molded article have a higher resistance to fluid permeability than that possessed by the crosslinked ethylene polymer. An effort to produce a rotationally molded article of a laminate of crosslinked polyethylene and a second polymer having a higher resistance to gasoline permeability by the sequential introduction of the two polymers into the rotational mold encountered difficulties in the form of holes in the second polymer layer and/or insufficient bonding of the two layers.

In accordance with the present invention, it has been discovered that these disadvantages can be avoided and a satisfactory hollow multi-layered article can be rotationally molded by the introduction of the second polymer charge at a time after at least substantially all of the solid particles of the crosslinkable polymer of ethylene have melted and prior to the time when the inner surface of the outer layer of the polymer of ethylene would become smooth and glossy.

Accordingly, it is an object of the present invention to provide a new and improved method for forming multilayered hollow articles. Another object of the invention is to provide a new and improved laminate. Another object of the invention is to provide a new and improved rotationally molded object having high impact strength, high resistance to stress cracking, and low permeability. Other objects, aspects, and advantages of the invention will be apparent from a study of the specification and the appended claims.

According to the invention, the outer continuous layer of the hollow multilayered article is formed from a polymer of ethylene, that is, an ethylene homopolymer, a copolymer of ethylene and at least one acyclic straight or branched chain mono-1-olefin hydrocarbon having 3 to 8 carbon atoms per molecule, or a mixture of such homopolymers, of such copolymers, or of at least one such homopolymer and at least one such copolymer; having incorporated therein a suitable crosslinking compound. A presently preferred group of such hydrocarbon comonomers are the straight chain hydrocarbons, particularly those straight chain hydrocarbons having 3 to 6 carbon atoms per molecule. The copolymers are usually formed with ethylene constituting at least 75 weight percent of the total monomers. Excellent results are obtained with copolymers of ethylene and 1-butene, wherein ethylene constitutes at least 75 weight percent of the total monomers. Other polymers of ethylene include, for example, copolymers of ethylene and propylene, copolymers of ethylene and isobutene, copolymers of ethylene and 1-pentene, copolymers of ethylene and 3-methyl-1butene, copolymers of ethylene and 1-hexene, copolymers of ethylene and 4-methyl-1-pentene, copolymers of ethylene and 1-heptene, copolymers of ethylene and 1-octene, and copolymers of ethylene and 4-ethyl-1-hexene.

In general, the uncross-linked polymer of ethylene employed for the outer layer will have a melt index of at least about 10, a density in the range of about 0.92 to about 0.97, preferably in the range of about 0.940 to about 0.965, and a molecular weight distribution not greater than about 7. Uncross-linked polymers having a melt index in the range of about 10 to about 200 give excellent results, with the polymers having a melt index in the range of about 10 to about 50 being presently preferred. The polymers can be produced by any suitable method and can be selected from among those commercially available where desired.

Suitable crosslinking compounds include the acetylenic diperoxy compounds, which includes the hexynes having the formula

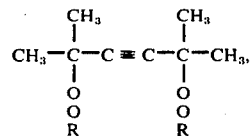

octynes having the formula

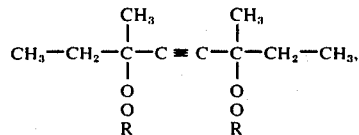

and octadiynes having the formula

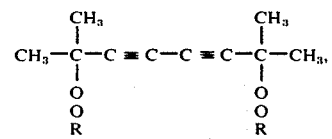

wherein R is selected from the group consisting of tertiary alkyl, alkoxycarbonyl, and benzoyl. In general, the molecular weights of the polyperoxides fall within the range of about 230 to about 550. Excellent results are received with the above-noted hexynes. Among the compounds encompassed within the above-noted hexynes, octynes, and octadiynes are:

2,7-Dimethyl-2,7-di(t-butylperoxy)octadiyne-3,5
2,7-Dimethyl-2,7-di(peroxy ethyl carbonate)octadiyne-3,5

3,6-Dimethyl-3,6-di(peroxy ethyl carbonate)octyne-4
3,6-Dimethyl-3,6(t-butylperoxy)octyne-4
2,5-Dimethyl-2,5-di(peroxybenzoate)hexyne-3
2,5-Dimethyl-2,5-di(peroxy-n-propyl carbonate)hexyne-3
2,5-Dimethyl-2,5-di(peroxy isobutyl carbonate)hexyne-3
2,5-Dimethyl-2,5-di(peroxy ethyl carbonate)hexyne-3
2,5-Dimethyl-2,5-di(alpha-cumyl peroxy)hexyne-3
2,5-Dimethyl-2,5-di(peroxy beta-chloroethyl carbonate)hexyne-3
2,5-Dimethyl-2,5di(t-butylperoxy)hexyne-3.

The crosslinking agent should be incorporated within the particles of the molding composition utilized to form the outer layer rather than being dry blended with particles of polymer. When dry blending of the polymer particles and the crosslinking agent is employed, there is a very severe problem of voids in the wall of the molded article formed from such dry blended material. Any suitable amount of crosslinking agent can be incorporated into the molding composition for the outer layer, as the amount employed can depend upon the specific crosslinking agent as well as the degree of crosslinking desired. In general the amount of the crosslinking agent will be in the range of about 0.1 to about 10, preferably in the range of about 0.5 to about 3, parts by weight per 100 parts by weight of the polymer of ethylene.

The solid thermoplastic polymer utilized to form the second continuous layer of the multilayered wall article can be any suitable material known in the art, for example, polyamides, including nylon 6-6, nylon 6, nylon 11; polycarbonates; homopolymers of mono-1-olefins having 2 to 8 carbon atoms per molecule, including polyethylene, polypropylene; copolymers of at least two mono-1-olefin having 2 to 8 carbon atoms per molecule, including copolymers of ethylene and propylene, copolymers of ethylene and isobutene; polyesters, including polyethylene terephthalate; polystyrene; and cellulosic polymers, including ethyl cellulose.

In accordance with a presently preferred embodiment, the solid thermoplastic polymer utilized to form the inner layer of the article has a significantly higher resistance to gasoline permeability than the polymer of the outer layer. This provides a combination of valuable physical properties, i.e., the structural strength of the crosslinked polymer of ethylene and the high resistance to gasoline permeability of the polymer of the inner layer.

During the heating and melting of the crosslinkable polymer of ethylene in the rotational mold, the reaction of the peroxy crosslinking compound liberates gas causing a bubbling in the polymer. This bubbling causes a roughened inner surface as all the polymer becomes substantially melted. As the cycle time lengthens, the bubbling diminishes, crosslinking takes place and the inside wall becomes smooth.

The critical time period for adding the charge of the second polymer to the molten layer of crosslinkable polymer of ethylene is between the time when the charge of the crosslinkable polymer is substantially melted, and the gas bubbling is substantially ended and the inside wall surface is still rough or frosty appearing, and the time when the inside wall surface would have become at least substantially smooth and glossy. If the charge of the second polymer is added too soon, i.e., while gas is still forming, blow holes appear in the inner layer of the final article. If the charge of the second polymer is added too late, the smooth inner surface of the outer layer prevents good adhesion.

The critical time can be determined for a given mold, particular article dimensions, and polymer compositions, as follows:

1. Use a mold having an opening port so that the mold can be indexed out of the oven while hot,
2. Charge the mold with a polymer of ethylene containing a crosslinking agent,
3. Choose a cycle time estimated to permit melting of about 100 percent of the crosslinkable polymer powder,
4. Heat the mold in the oven at the desired molding temperature for the chosen cycle time, 5. Index the mold out of the oven while hot,
6. Add the charge of the second polymer and return the mold to the oven.
7. Heat the mold in the oven for a cycle time which will allow 100 percent of the particles of the second polymer to melt,
8. Index the mold to a cooling station and cool, solidifying both polymers,
9. Open the mold and remove the molded article,
10. Inspect sections of the molded article to determine the adhesion of the two layers. If blow holes are present in inner wall, the cycle time before adding the second polymer is too short. If the layers exhibit poor adhesion, the cycle time before adding the second polymer is too long.
11. Repeat the above procedure until good adhesion is obtained for the layers without blow holes in the inner layer to determine optimum cycle time.

To stabilize the molded article to avoid a change of properties upon extended exposure to heat, it is preferred that an antioxidant be incorporated into each polymer composition prior to molding. Any suitable stabilizing antioxidant can be used. Stabilizers which have produced excellent results in the practice of the invention include polymerized trimethyl dihydroquinoline and polymerized 1,2-dihydro-2,4-trimethyl quinoline. In general, an amount of stabilizer needed to accomplish the desired stabilization will be used and excess stabilizer generally will be avoided because of excess cost and possible detrimental effect on the product. Amounts in the range of 0.001 to 5 parts by weight per 100 parts by weight of the polymer have been suitable. Often superior stabilization without excessive cost is obtained in the range of 0.01 to 1 part by weight of stabilizer per 100 parts by weight of the polymer.

Other ingredients which do not adversely affect either the rotational molding or the crosslinking and which do not impart undesirable characteristics to the finished article can be added. Examples of such materials which can be added under suitable conditions and in suitable amounts include pigments, additional stabilizers such as metal complexing agents, antistatic agents, ultraviolet absorber for light stabilization, fillers, reinforcing materials, etc. However, one should make certain that any additive selected is compatible with the specific composition to permit good molding and crosslinking to obtain well formed articles having desired properties.

The following example is presented in further illustration of the invention, but should not be construed in undue limitation thereof.

EXAMPLE

In the following runs, polymeric composition A comprises a homopolymer of ethylene having a density of 0.965 (ASTM D-1505-63T, grams/cc.), a melt index (ASTM D-1238-62T, grams/10 min., Condition E) in the range of 28 to 30, and a Vicat softening point (ASTM D-1525-65T) of 259°F admixed with 0.75 weight percent, based on the polymer, of 2,5-dimethyl-2,5-di(t-butylperoxy)hexyne-3. Polymeric composition B is a copolymer of ethylene and butene, having a density of 0.955, a melt index of 6.5, and a Vicat softening point of about 254° F. Polymer N is a molding grade nylon 11, having a melting point of about 367° F.

In each instance the polymeric composition was ground to pass a 35 mesh sieve number (U.S. Standard Sieve Series). In each run, the article molded was a three-quart bottle having a top opening. The molding procedure comprised the introduction of the first charge of particulate polymer into the rotational mold, the positioning of the rotational mold in an oven for a first period of time with the oven temperature maintained at about 650° F, the removal of the mold from the oven at the end of the first period of time for the introduction of the second charge of particulate polymer into the mold, the repositioning of the mold in the oven for a second period of time with the oven temperature maintained at about 650°F, the removal of the mold from the oven at the end of the second period of time, subjecting the mold to a water vapor fog for 1½ minutes followed by a 3-minute water spray with a water temperature of 58°F, and the removal of the solidified bottle from the mold. The mold was rotated about a major axis (longitudinal axis of the bottle) at 12 rpm. In runs 1 through 5, the mold was also rotated about a minor axis perpendicular to the major axis at 6 rpm, while in run 6 the mold was also rotated about the minor axis at 22 rpm.

| Run | First Charge Polymer | Weight, gms. | Second Charge Polymer | Weight, gms. | Molding Time, minutes First Period | Second Period |
|---|---|---|---|---|---|---|
| 1 | A | 150 | N | 100 | 6 | 5 |
| 2 | A | 150 | N$^{(a)}$ | 100 | 6 | 5 |
| 3 | B | 150 | N | 100 | 6 | 5 |
| 4 | A | 150 | N | 100 | 6 | 5 |
| 5 | A | 150 | N | 100 | 9 | 5 |
| 6 | A | 150 | N$^{(b)}$ | 150 | 15 | — |

$^{(a)}$The nylon 11 powder was dried in an oven at 250°F for 30 minutes before being employed in the molding operation.
$^{(b)}$Polymeric composition A and polymeric composition N were admixed, and the admixture was introduced into the mold as a single charge.

In runs 1 and 2, there were holes extending through the inner layer of the bottle.

In run 3, there were no bubbles in either layer of the bottle, but the two layers exhibited poor adhesion as compared to the adhesion of the layers of the bottles of runs 1 and 2.

In run 4, the mold was vented to the atmosphere during the molding operation, but the nylon layer still had gas bubbles extending therethrough.

In run 5, there were small bubbles at the interface of the two layers, but none extending through the nylon layer, and the adhesion of the layers was greater than that in runs 1 and 2.

In run 6, the admixture of two polymeric compositions resulted in a single heterogeneous wall with discontinuous chunks of each polymer, with rough surfaces on both the inside and outside of the bottle.

Reasonable variations and modifications are possible within the scope of the foregoing disclosure and the appended claims to the invention.

We claim:

1. A method for rotationally molding a hollow multi-layered article which comprises introducing into a rotational mold a first quantity of solid particles of a first composition of matter comprising a first solid thermoplastic polymer selected from the group consisting of ethylene homopolymers, copolymers of ethylene and at least one acyclic mono-1-olefin hydrocarbon having 3 to 8 carbon atoms per molecule, and mixtures thereof, said first solid polymer having a melt index of at least about 10 having incorporated therein a crosslinking amount of an acetylenic diperoxy compound selected from the group consisting of hexynes having the formula

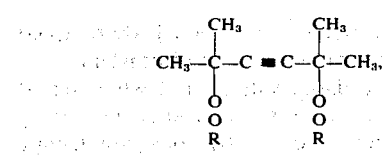

octynes having the formula

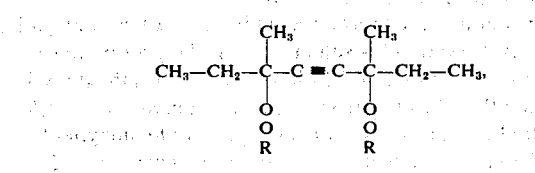

and octadiynes having the formula

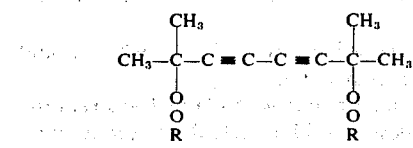

wherein R is selected from the group consisting of tertiary alkyl, alkyoxycarbonyl, and benzoyl;

rotating said mold containing said first composition of matter about at least one axis while heating said mold to a temperature above the softening point of said first composition of matter and above the thermal decomposition temperature of said acetylenic diperoxy compound, said first quantity being sufficient to form a first continuous layer of said first composition on the inner wall of said mold; the thermal decomposition of said acetylenic diperoxy compound liberating gas causing the formation of bubbles in said first continuous layer;

introducing into said mold, at a time after at least substantially all of said first quantity of solid particles have melted to form a rough inner surface of said first continuous layer and the formation of substantially all of said bubbles has been completed and prior to the time when the inner surface of said first continuous layer would become smooth and glossy, a second quantity of solid particles of a second solid thermoplastic polymer, said second quantity being sufficient to form a second continuous layer of said second solid polymer on the inside surface of said first continuous layer;

rotating said mold containing said first composition of matter and said second quantity of solid particles about at least one axis while heating said mold to a temperature above the melting point of said second solid thermoplastic polymer to form and melt said second continuous layer;

cooling said mold containing the thus molded article to a temperature at which said first and second continuous layers are solidified; thereby forming a laminated article having good adhesion between said first continuous layer and said second continuous layer, said second continuous layer being at least substantially free of said bubbles; and removing the thus solidified article from said mold.

2. A method in accordance with claim 1 wherein said first solid polymer has a density in the range of about 0.92 to about 0.97 and a molecular weight distribution not greater than about 7.

3. A method in accordance with claim 1 wherein said first solid polymer is a homopolymer of ethylene.

4. A method in accordance with claim 1 wherein said first solid polymer is a copolymer of ethylene and at least one acyclic mono-1-olefin hydrocarbon having from 3 to 8 carbon atoms per molecule.

5. A method in accordance with claim 1 wherein said diperoxy compound is a hexyne.

6. A method in accordance with claim 1 wherein said diperoxy compound is selected from the group consisting of 2,5-dimethyl-2,5-di-(t-butylperoxy)hexyne-3; 2,5-dimethyl-2,5-di(peroxybenzoate)hexyne-3; 2,5-dimethyl-2,5-di(peroxy-n-propylcarbonate)hexyne-3; 2,5-di(peroxy isobutyl carbonate)hexyne-3; 2,5-dimethyl-2,5-di(peroxy ethyl carbonate)hexyne-3; 2,5-dimethyl-2,5-di(alpha-cumyl peroxy)hexyne-3; 2,5-dimethyl-2,5-di(peroxy beta-chloroethyl carbonate)-hexyne-3.

7. A method in accordance with claim 1 wherein said second solid polymer is nylon 11.

8. A method in accordance with claim 1 wherein the crosslinking reaction of said acetylenic diperoxy compound continues after the introduction of said second solid thermoplstic polymer into said mold.

9. An article of manufacture made by the method of claim 1.

10. A method in accordance with claim 1 wherein said second solid polymer is different from said first solid thermoplastic polymer.

11. A method in accordance with claim 10 wherein said second solid polymer is selected from the group consisting of polyamides, polycarbonates, homopolymers of mono-1-olefins having 2 to 8 carbon atoms per molecule, copolymers of at least two mono-1-olefins having 2 to 8 carbon atoms per molecule, polyesters, polystyrene, and cellulosic polymers.

12. A method for rotationally molding a hollow multilayered article which comprises introducing into a rotational mold a first quantity of solid particles of a first composition of matter comprising a first crosslinkable solid thermoplastic polymer, said first solid polymer having incorporated therein a crosslinking amount of a suitable crosslinking compound;

rotating said mold containing said first composition of matter about at least one axis while heating said mold to a temperature above the softening point of said first composition of matter and above the thermal decomposition temperature of said crosslinking compound, said first quantity being sufficient to form a first layer of said first composition on the inner wall of said mold; the thermal decomposition of said crosslinking compound liberating gas causing the formation of bubbles in said first layer;

introducing into said mold, at a time after at least substantially all of said first quantity of solid particles have melted to form a rough inner surface of said first layer and the formation of substantially all of said bubbles has been completed and prior to the time when the inner surface of said first layer would become smooth and glossy, a second quantity of solid particles of a second solid thermoplastic polymer, said second quantity being sufficient to form a second layer of said second solid polymer on the inside surface of said first layer;

rotating said mold containing said first composition of matter and said second quantity of solid particles about at least one axis while heating said mold to a temperature above the melting point of said second solid thermoplastic polymer to form and melt said second layer;

cooling said mold containing the thus molded article to a temperature at which said first and second layers are solidified; thereby forming a laminated article having good adhesion between said first layer and said second layer, said second layer being at least substantially free of said bubbles; and removing the thus solidified article from said mold.

13. An article of manufacture made by the method of claim 12.

14. A method in accordance with claim 12 wherein said second solid polymer is different from said first solid polymer.

15. A method in accordance with claim 14 wherein said first solid polymer is selected from the group consisting of ethylene homopolymers, copolymers of ethylene and at least one acyclic mono-1 olefin hydrocarbon having 3 to 8 carbon atoms per molecule, and mixtures thereof, said first solid polymer having a melt index of at least about 10.

* * * * *

UNITED STATES PATENT AND TRADEMARK OFFICE
CERTIFICATE OF CORRECTION

PATENT NO. : 3,976,821
DATED : August 24, 1976
INVENTOR(S) : Guy E. Carrow et al It is certified that error appears in the above-identified patent and that said Letters Patent are hereby corrected as shown below:

Column 7, line 34, delete "2,5-di(peroxy isobutyl carbonate)-hexyne-3" and insert -- 2,5-dimethyl-2,5-di(peroxy isobutyl carbonate)hexyne-3 --; line 44, delete "thermoplstic" and insert -- thermoplastic --. Column 8, line 52, delete "mono-lolefin" and insert -- mono-1-olefin --.

Signed and Sealed this

Twenty-third Day of November 1976

[SEAL]

Attest:

RUTH C. MASON
Attesting Officer

C. MARSHALL DANN
Commissioner of Patents and Trademarks